(12) United States Patent
Rueckert

(10) Patent No.: US 11,558,844 B2
(45) Date of Patent: Jan. 17, 2023

(54) METHOD FOR REGISTERING A TARGET DEVICE WITH A NETWORK

(71) Applicant: Tobias Rueckert, Winterbach (DE)

(72) Inventor: Tobias Rueckert, Winterbach (DE)

( * ) Notice: Subject to any disclaimer, the term of this patent is extended or adjusted under 35 U.S.C. 154(b) by 54 days.

(21) Appl. No.: 17/073,360

(22) Filed: Oct. 18, 2020

(65) Prior Publication Data

US 2021/0037497 A1  Feb. 4, 2021

Related U.S. Application Data

(63) Continuation-in-part of application No. PCT/EP2019/060745, filed on Apr. 26, 2019.

(30) Foreign Application Priority Data

May 1, 2018 (DE) ...................... 10 2018 110 423.5

(51) Int. Cl.
*H04W 60/00* (2009.01)
*H04W 76/10* (2018.01)
(Continued)

(52) U.S. Cl.
CPC ........... *H04W 60/00* (2013.01); *H04W 76/10* (2018.02); *G10L 19/005* (2013.01); *H04W 84/12* (2013.01)

(58) Field of Classification Search
CPC ..... H04W 60/00; H04W 76/10; H04W 84/12; G10L 19/005; H04L 12/2803; H04L 12/403
See application file for complete search history.

(56) References Cited

U.S. PATENT DOCUMENTS

2009/0157731 A1* 6/2009 Zigler .................. G06F 16/686
707/999.102
2013/0173811 A1   7/2013 Ha et al.
(Continued)

FOREIGN PATENT DOCUMENTS

DE    10 2016 014 479 A1    6/2018

OTHER PUBLICATIONS

The International Search Report for the corresponding international application No. PCT/EP2019/060745, dated Jun. 6, 2019 in the German language (3 pages).
(Continued)

*Primary Examiner* — Walter J Divito
*Assistant Examiner* — Anthony Luo
(74) *Attorney, Agent, or Firm* — Ronald S. Lombard

(57) ABSTRACT

A method for registering a target device with a network. The method includes a user sending an electronic registration message from a terminal device to a universal communication platform, wherein the registration message comprises information about an identity of the target device and an option for registering with the network. Integrating the information in the registration message into an audio file by the universal communication platform. Sending the audio file from the universal communication platform to the user's terminal device. Playing the audio file by the terminal device of the user. The content of the audio file is captured by a microphone of the target device, and the information on the option for registering with the network is extracted. The target device registers with the network using the registration option.

9 Claims, 1 Drawing Sheet

(51) Int. Cl.
*G10L 19/005* (2013.01)
*H04W 84/12* (2009.01)

(56) References Cited

U.S. PATENT DOCUMENTS

| | | |
|---|---|---|
| 2014/0167931 A1 | 6/2014 | Lee et al. |
| 2015/0072653 A1 | 3/2015 | Fan et al. |
| 2015/0327304 A1 | 11/2015 | Tinnakornsrisuphap et al. |
| 2016/0226676 A1 | 8/2016 | Shin et al. |
| 2017/0149720 A1* | 5/2017 | Castagna ................ H04L 67/02 |
| 2017/0186309 A1 | 6/2017 | Sager et al. |
| 2018/0115890 A1* | 4/2018 | Lee ........................ G08B 21/24 |
| 2018/0227066 A1* | 8/2018 | Fayyad .............. G06Q 30/0267 |
| 2019/0036985 A1* | 1/2019 | Ravichandran ..... H04L 65/1083 |
| 2019/0089789 A1* | 3/2019 | Doerner .................. G06F 21/44 |
| 2019/0268722 A1* | 8/2019 | Elswick .................. G06F 16/22 |

OTHER PUBLICATIONS

The English translation of the International Search Report for the corresponding international application No. PCT/EP2019/060745 (2 pages).
A Search Report of the German Patent Office for a corresponding German Patent Application No. 10 2018 110 423.5, dated Jan. 25, 2019 to which the present application claims priority benefit.
A Google generated English translation of the substantive portion of the German Patent Office Search Report for the corresponding German Patent Application No. 10 2018 110 423.5.

\* cited by examiner

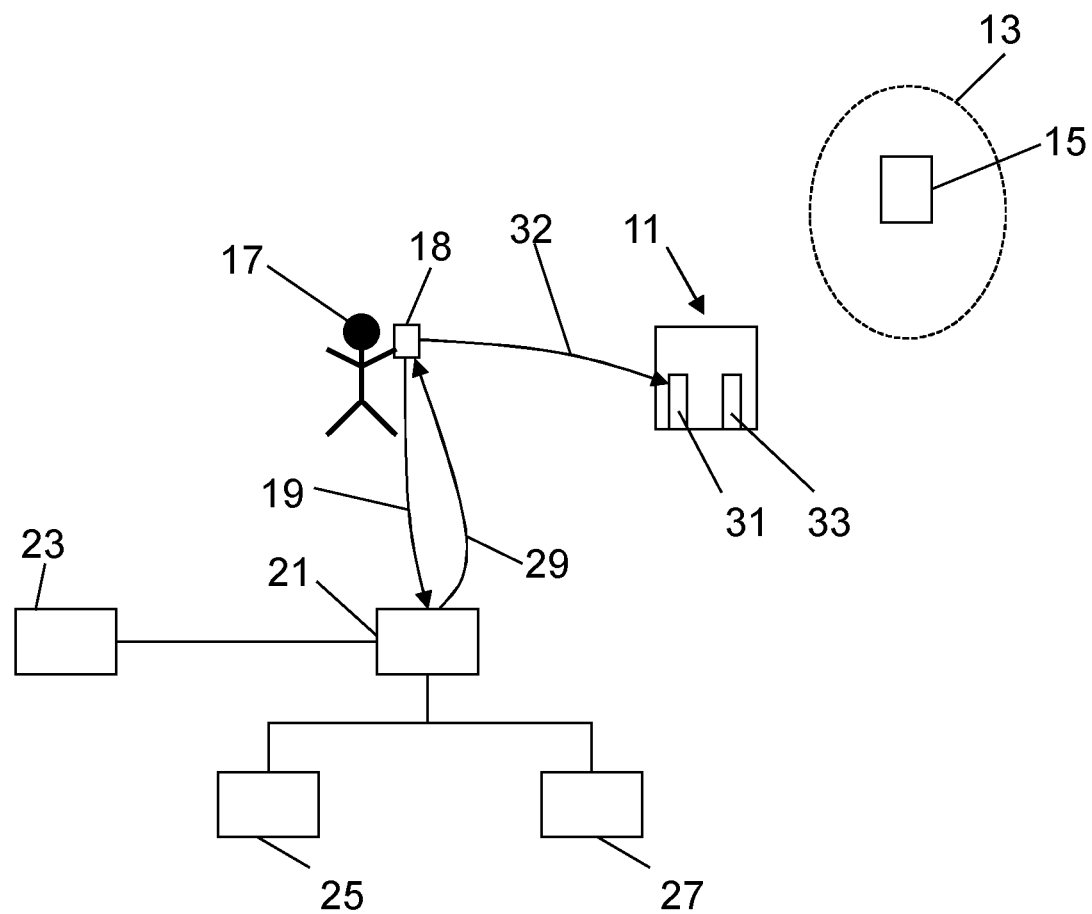

METHOD FOR REGISTERING A TARGET DEVICE WITH A NETWORK

CROSS-REFERENCE TO RELATED APPLICATION

This is a continuation-in-part application of international application PCT/EP2019/060745 filed Apr. 26, 2019 and claiming the priority of German Application No. 10 2018 110 423.5 filed May 1, 2018. The aforesaid international application PCT/EP2019/060745 and German Application No. 10 2018 110 423.5 are both incorporated herein by reference in their entireties as though fully set forth.

BACKGROUND OF THE INVENTION

The invention relates to a method for registering a target device with a network with the features of the claims.

Many electronic devices for industrial, commercial, and private use have an interface via which information, such as status information or measured values, can be read or the device can be controlled, for example activated, deactivated, or configured. Examples of this in the private sector include weather stations that measure temperature and air quality, surveillance cameras, air conditioners, televisions, heating control systems, refrigerators, and in the industrial sector, machine tools or access systems. Such electronic devices are referred to as target devices in the following. The connection to the corresponding device can usually be established by means of special programs on a computer, a tablet computer, a smartphone, a wearable device, or another electronic device that can execute programs or apps. These electronic devices are referred to as terminal devices in the following. In order to be able to establish the connection stated above, for example, a connection via a wireless link, in particular the Internet, it is necessary to register the target device with a network, for example a WLAN network. Registering the target device with a network, such as a password-protected WLAN, can be quite complex and cumbersome, especially since the target devices often do not have a keyboard. A wireless LAN (WLAN) is a wireless computer network that links two or more devices using wireless communication to form a local area network (LAN) within a limited area such as a home, school, computer laboratory, campus, or office building.

In contrast, it is in particular the object of the invention to propose a method for registering a target device to a network, which is easy to carry out. According to the invention, the objective is achieved by means of a method having the features of the claims.

SUMMARY OF THE INVENTION

The method according to the invention for registering a target device with a network has at least the following steps, which are carried out in particular in the stated order:

A user sends an electronic registration message from a terminal device to a universal communication platform, whereby the registration message contains information on an identity of the target device and an option for registration with said network.

Integration of said information in the registration message into an audio file by the universal communication platform.

Sending said audio file from the universal communication platform to the user's terminal device.

Playing the audio file by said user's terminal device.

Recording of the contents of the audio file by means of a microphone of the target device and extracting the information about the option for registration with said network.

Registering with the network using the said registration option by means of the target device.

"Registering a target device with a network" shall be understood to mean the establishment of a communication link between the target device and other subscribers in said network is made possible. A "communication link" shall be understood here to mean that electronic devices can exchange information, for example electronic messages. In particular, the network is at least partially wireless, for example the network is designed as a WLAN, a Bluetooth network, or a long range wide area network. The network is connected in particular to the Internet, so that after the target device registers with the network, there is a connection between the target device and the Internet. After the target device has registered with the network, communication in particular between a terminal device of a user and the target device is then possible. The said terminal device can also be integrated into the network. It is also possible, though, that the terminal device communicates with a universal communication platform, which in turn communicates via the Internet and/or the network with the target device. The target device may need to register with a network, for example the first time the target device is started after purchase of the target device.

To register the target device, the user first sends an electronic registration message to a universal communication platform. The universal communication platform has at least one so-called recipient address, which the user can use to send the electronic message to the universal communication platform. A recipient address may be in the form of, for example, an e-mail address, a mobile phone number, a WhatsApp® or Facebook® account, or a similar entity. In this context, a universal communication platform is understood to be an electronic device or a service executed on a server in the Internet, which enables communication between the user's terminal device and the target device. In the simplest case, the universal communication platform is designed as a router of a WLAN network. The registration message can be formatted in a special, predefined format or as plain text. The registration message can be formatted in particular as text. However, it is also possible that the registration message consists at least in part of a voice message and/or images, for example an image of a wireless router with a printed access code.

In particular, the user uses a communication channel for the registration message through which the user can communicate with other users; for example, via a short message service such as SMS, Twitter®, WhatsApp®, or e-mail; via messages in a social network such Facebook®, or via a special, particularly secure messenger or chat app. In order to make this possible, the universal communication platform is designed so that it can receive and interpret the registration message transmitted by the user via one of the said communication channels. The electronic registration message can also be provided from information input by the user on an Internet page, which the user has opened on the terminal device, provided by the universal communication platform. In this case, the recipient address of the universal communication platform is the address of said Internet site.

The electronic registration message contains information about the identity of the target device and an option for registration with said network. The information on the identity of the target device may include, for example, a serial number and, as an option, the manufacturer of the target device.

The target device may have a QR code on it, for example, which contains information on the identity of the target device and which can be easily read using a camera of the user's terminal device. The information about the identity of the target device can, for example, also be contained in written documents such as a warranty certificate.

A QR code is a two-dimensional code that contains information, especially in the form of text. A QR code consists of a square matrix of black and white squares that represent the encoded data in binary form. A special marker in three of the four corners of the square indicates the orientation of the QR code. There are a variety of apps for mobile terminal devices available by means of which QR codes can be read using a camera. It is also conceivable that no special app for reading QR codes must be used, and instead the "normal" camera app is designed so that it can automatically recognize, read, and convert QR codes.

For example, the information for registration with the network can include a password and, optionally, the name of the network implemented as a WLAN network. Said information can also be provided in other ways that appear reasonable to a person skilled in the art.

The electronic registration message is transmitted in particular in encrypted form from the user's device to the universal communication platform. Different encryption methods can be used, for example AES encryption (Advanced Encryption Standard).

The universal communication platform first interprets the registration message received. It searches the registration message for specific keywords such as "register" or "onboarding" for this purpose. If it has recognized one of these keywords, it extracts the information on the identity of the target device and the option for registration with said network. For this purpose, for example, it can also search for keywords such as "serial number" or "password" and extract the required information from the registration message. For the interpretation of the registration message, the universal communication platform can also access a knowledge database. A knowledge database is to be understood here in particular to be a semantic database or a natural language processing library. Such knowledge databases are made available by providers on the Internet whose services can be used, for example, for a user fee.

Examples of such a knowledge base are "Watson" from IBM® and "Dialogflow" from Google®.

When the registration message is entered by the user on a website provided by the universal communication platform, the information is input in predefined fields so that it can be extracted very easily.

After extracting said information from the registration message, the universal communication platform generates an audio file and integrates the information about the identity of the target device and the option for registration with said network into the audio file. The information can be stored in a binary format in the audio file, for example. A modified frequency shift keying method, for example, can be used for this purpose. In this method, the amplitude of the sound in the audio file does not carry any information. The information is instead contained in the time intervals between the positive or negative zero crossings of the signal, for example a short time interval between two zero crossings represents a 0 and a long time interval, for example twice as long, represents a 1. In addition, other methods deemed appropriate by a person skilled in the art for encoding information can be applied to an audio file.

The universal communication platform sends said audio file to the user's terminal device. In particular, the audio file is also sent in encrypted form to the terminal device. For this purpose, the universal communication platform uses, for example, the same communication channel over which the user has sent the registration message. However, it is also possible to use a different communication channel.

The user's terminal device, for example, plays the received audio file via a built-in speaker or sends it to a device with a speaker from which the sounds recorded in the audio file are output. The audio file is played back in particular in the vicinity of the target device so that a microphone of the target device can detect the sounds played, and therefore the content of the audio file. The target device extracts the information about the option for registration with said network, for example a password for a network implemented as a protected WLAN network.

The algorithms required for extraction are programmed in the target device. It is also possible to update the algorithms after connecting to the Internet. In particular, the target device is designed so that it only completely extracts or evaluates the content of the received audio file if it recognizes that the information is intended for the target device. For this purpose, it can first extract the information about the identity of the target device. If the identity of the target device in the audio file matches its own identity, then it also extracts the information about the options for registration with the network.

Finally, the target device registers with the network using the information about the registration option, for example with the information about the name of the WLAN network and the password. The target device is thus registered with the network and can send data or information over the network and receive commands. The user can thus communicate via a terminal device directly or via the individual communication platform.

Communication between a user with a terminal device and a target device is understood here to be the exchange of digital information. For example, the user may send a command to the target device, for example to set a target temperature of an air conditioner. It is also possible that the user specifies settings on a target device, for example to specify that an air conditioner turns on from Monday to Friday in the morning at 8:00 AM. On the other hand, the target device can, for example, transmit measured values to the terminal device such as the current temperature, status information on whether or not it is currently active, for example, or even acknowledgments of commands. This type of communication is also collectively referred to using the phrase "Internet of Things" (IoT).

The target devices can be designed, for example, as air conditioning systems, weather stations, security cameras, cars, heating controls, refrigerators, controllers for rolling shutters, processing machines, access systems, or wearables. The target devices can therefore be the building blocks of a smart home, connected car, or general Internet of Things applications, for example. Basically, all electrical, electronic, or photonic devices with the ability to register with a network are conceivable as target devices.

In an embodiment of the invention, the universal communication platform checks whether the target device is allowed to register with said network and only sends said audio file to the user's terminal device if the test result is positive. This ensures that no "unwanted" target devices register with the network and, in particular, that only users who have the right to register a target device are registered.

For example, the universal communication platform checks if the target device has already been registered on another network by another user. If this is the case and this user has not released the target device via a suitable release message, then the target device must not register with the network. In this case, the universal communication platform sends in particular a corresponding message to the user. It is also possible that a list of all target devices that are allowed to register with a network and/or a special network is stored in the universal communication platform. In this case, after receiving a registration message, the universal communication platform checks if said list contains the corresponding target device. If this is the case, said audio file is generated and sent to the user. If this is not the case, a message that the target device is not allowed to register with the network is sent to the user.

In an embodiment of the invention, the universal communication platform, for the said test of whether or not the target device is allowed to register with said network, exchanges information with at least one specific communication platform. This allows great flexibility when designing the test.

A specific communication platform shall be understood here as a communication platform for a given selection of target devices. A specific communication platform is intended, for example, for the target devices of a specific manufacturer. In order to use such a specific communication platform, a special program is usually required on a terminal device of a user. The information between the target device and the terminal device is then transmitted using a special protocol supported by the program used.

The protocols used in various specific communication platforms differ greatly. A user who wants to exchange information with target devices from different manufacturers therefore must use different terminal devices and/or different programs with different protocols. Communication with target devices from different manufacturers can be greatly simplified if the user communicates with his terminal device with a universal communication platform, which then forwards the information using the appropriate protocol to the corresponding specific communication platform. Such methods are, for example, are described in the non-prepublished German patent application of the applicant with the application No. 1/2016014479.3.

In the present embodiment of the invention, for example, lists of the target devices allowed to register with a network are stored in one or more specific communication platforms. As soon as the universal communication platform receives a registration message, it requests at least one specific communication platform if the corresponding target device is allowed to register with the network. In the case of a positive response, it generates the audio file and sends it to the user. In the case of a negative response, it sends a message to the user.

In an embodiment of the invention, the universal communication platform can receive electronic registration messages from more than one recipient address, wherein in particular each recipient address is assigned a specific communication platform. This makes it easy for the universal communication platform to determine which specific communication platform to request for registration authentication.

As stated above, a specific communication platform is assigned in particular to a specific manufacturer of target devices. This means that every manufacturer who works with the universal communication platform can offer their customers, and thus users of the target devices, their own recipient address. The registration messages sent to the various recipient addresses are all received by the universal communication platform and can be assigned to a specific communication platform, and thus to a particular manufacturer, using the recipient address. It is also possible for a specific communication platform or a manufacturer to be assigned a plurality of recipient addresses or for a recipient address to be assigned to a plurality of specific communication platforms or manufacturers.

In an embodiment of the invention, the target device, after successfully registering with the network, sends a registration confirmation to the universal communication platform and/or the specific communication platform, and after receiving the registration confirmation, the target device is assigned to the user. This makes it easily possible to ensure that only the authorized user can communicate with the target device.

When using a communication link between the terminal device and the target device via a universal or a specific communication platform, it is not desirable for every user to be able to send an electronic message to any target device, for example in the form of a command. However, it would be very cumbersome if a user were required to provide authorization every time before sending an electronic message to a target device, for example by entering a user ID and password. The described assignment of the target device to the user prevents the unauthorized access to the target device by other users.

The target device transmits the registration confirmation, in particular via the network with which it has registered, to the universal communication platform and/or the specific communication platform. In particular, the user is identified via his user contact address from which he has sent the registration message to the universal communication platform. For this purpose, a list of all authorized users with their various user contact addresses is stored in a universal or a specific communication platform.

A user contact address is to be understood in general to be an identifier that can be used to address and send an electronic message to the user via a communication channel. The user contact address can be, for example, a mobile phone number for addressing an SMS, a WhatsApp® message, a Facebook® identifier, a Twitter® identifier, or an e-mail address. In addition, further user contact addresses are conceivable. It only needs to be ensured that when sending an electronic message, the sender of the message can be identified by the specified user contact address.

An assignment of the target device to a user shall be understood in this context that the target device is linked to the user so that he can communicate in particular via a terminal device with the target device, and thus exchange information without having to provide authorization again each time information is exchanged.

In particular, it is possible that a user to whom the target device is assigned gives another user access to a specific target device for a specific period of time only. For example, if the other user is a guest in a hotel, access to a target device in the hotel room is only given to the other user for the duration of his stay. After the end of the stay, access authorization automatically expires without requiring any further action.

In order to be able to change the assignment of a target device, the user can in particular remove the assignment of a target device to him.

In an embodiment of the invention, the microphone of the target device is automatically deactivated after successfully registering with the network. Improper use of the microphone, for example to listen in on a room by an unauthorized user, can thus be prevented. The user to whom the target device is assigned can reactivate the microphone by sending a corresponding instruction to the target device. In particular, the target device can additionally have an option for activating or deactivating the microphone, for example a switch.

In an embodiment of the invention, the target device generates an error audio file when registration with the network is unsuccessful and outputs this audio file in particular via a built-in speaker or a speaker connected via a cable. The error audio file is received by a user's terminal device and sent to the universal communication platform. The same recipient address as for the registration message can be used for sending, or a special recipient address for error audio files can be used for sending. The universal communication platform evaluates the error audio file and returns an appropriate reply message to the user. In particular, the reply message contains information on how to successfully register with the network.

With this embodiment of the invention, the user can also get help for registering with a network on target devices without display options, for example without a display screen.

The universal communication platform first extracts the content of the error audio file, i.e. the error message of the target device. In particular, a table with error messages and corresponding reply messages is stored in the universal communication platform for the purpose of generating the reply messages. The reply message sent to the user can comprise a text message, an audio file, or a link to a website with additional information, for example.

In an embodiment of the invention, the universal communication platform exchanges information with at least one specific communication platform for the generation of said reply message. The reply messages for the user can thus be generated very flexibly.

In an embodiment of the invention, the universal communication platform converts the error audio file into an error protocol and sends the error protocol to at least one specific communication platform. In this manner, only the universal communication platform, and none of the special communication platforms, needs to be able to extract information from an error audio file.

An error protocol is to be understood here to be a machine-readable protocol, for example in ACSII format, which can be evaluated easily by the specific communication platform. ACSII is the acronym for the American Standard Code for Information Interchange. It is a code for representing 128 English characters as numbers, with each letter assigned a number from 0 to 127. In this case, the universal communication platform can only generate one type of error protocol or, in particular, a type of error protocol adapted to the corresponding specific communication platform.

BRIEF DESCRIPTION OF THE DRAWING

Further embodiments of the invention will become apparent from the description and the drawing. Exemplary embodiments of the invention are shown schematically in simplified form in the sole FIGURE and explained in more detail in the following description.

DETAILED DESCRIPTION OF THE PARTICULAR EMBODIMENTS

In this case, the sole FIGURE shows a communication system by means of which a user can communicate with a target device.

The sole FIGURE shows a target device 11 that shall be registered with a network 13 in the form of a password-protected WLAN network. The network 13 is managed by a router 15, which is also connected to the Internet. To be able to register with the network 13, a correct password must be specified.

A user 17 knows this password, which can be referred to as a registration option for registering with the network 13. To register the target device 11 with the network 13, the user 17 sends an encrypted electronic registration message (symbolized by the arrow 19) to a universal communication platform 21 via a terminal device 18, for example in the form of a smartphone. The universal communication platform 21 is a service that runs on one or more servers on the Internet, for example in an Internet cloud. The user 17 sends a WhatsApp® message, for example, as a registration message to a recipient address of the universal communication platform 21. The recipient address as well as a serial number of the target device 11 are contained in written documents of the target device 11. The recipient address and/or serial number can also be contained in a QR code applied to the target device 11. The serial number can be considered information about the identity of the target device 11. The registration message to the universal communication platform 21 contains the password for the network, in addition to the serial number of the target device 13, and a keyword identifying the electronic message as a registration message.

The electronic registration message can comprise the following, for example: "Registration serial number: 123 Password ABC", where "Registration" is the named keyword, "123" is the serial number, and "ABC" is the password. The universal communication platform 21 can also have one or more special recipient addresses that are only used for registration messages. In this case, the use of a keyword is not necessary.

The universal communication platform 21 first interprets the registration message received.

To do this, it searches the registration message for certain keywords, such as "registration" or "onboarding". Once it has recognized one of these keywords, it extracts the information on the identity of the target device 11 and the option for registering with the network 13. To do this, it searches for keywords such as "serial number" or "password" and extracts the information from the registration message. The universal communication platform can also access a knowledge database 23 on the Internet to interpret the registration message 21.

It is also possible that the electronic registration message does not contain the password, upon which, as a result of the registration message, the user is directed to a special, especially secure website on which he can enter the password.

If the universal communication platform 21 has extracted the serial number of the target device 11 and the password for the network 13, the universal communication platform 21 checks in particular if the target device 11 is allowed to register with said network 13. The universal communication platform 21 exchanges information with at least one specific communication platform such as, a specific communication platform 25. The universal communication platform 21 also has a communication link to another specific communication platform 27. Because the user 17 sent the registration message to the recipient address of the universal communication platform 21 assigned to the specific communication platform 25, the universal communication platform 21 knows that, in this example, it must request the specific communication platform 25. In addition to the recipient address assigned to the specific communication platform 25, the universal communication platform 21 can also receive registration messages from another recipient address assigned to the other specific communication platform 27.

The specific communication platform 25 is operated by the manufacturer of the target device 11. There is a table in the specific communication platform 25 containing all serial numbers of target devices that can register with a network. In addition, the table stores information on whether or not a target device is already assigned to a user, and possibly even to which user. The universal communication platform 21 sends the serial number of the target device to the specific communication platform 25.

If the serial number of the target device 11 is contained in said table and it is not yet assigned to any other user, the specific communication platform 25 reports back to the universal communication platform that the target device 11 is allowed to register with the network 13.

If the universal communication platform 21 receives a positive reply message from the specific communication platform 25, which means the target device 11 is allowed to register with the network 13, then the universal communication platform 21 generates an audio file and integrates information about the identity of the target device in the form of the serial number of the target device 11 as well as the options for registering with the network 13 in the form of the password into the audio file. The audio file can be generated by the universal communication platform 21 itself or by an external service addressed via the Internet.

The universal communication platform 21 sends said audio file in encrypted form to the terminal device 18 of the user 17 (symbolized by arrow 29). The universal communication platform 21 uses the same communication channel, i.e. a WhatsApp® message, via which the user 17 sent the registration message.

The user 17 plays the received audio file via a speaker, which is not shown, of the terminal device 18 so that the target device 11 can capture the sounds played (symbolized by arrow 32), i.e. the content of the audio file, via a built-in microphone 31. The target device 11 first extracts the serial number from the audio file. If the extracted serial number matches its own serial number, then the target device 11 also extracts the password for the network 13. The algorithms required for extraction are programmed in the target device 11.

Finally, the target device 11 registers with the network 13 using the password extracted. The target device 11 is thus registered with the network 13 and can send data or information and/or receive commands over the network 13. Since the network 13 is also connected to the Internet, the target device 11 can also send information and receive commands via the Internet.

After successfully registering with the network 13, the target device 11 sends a registration confirmation to the universal communication platform 21. After the universal communication platform 21 receives the registration confirmation, the target device 11 is assigned to the user 17. It is also possible that the target device 11, after successfully registering with the network 13, initially sends an electronic message to the specific communication platform 25, after which the specific communication platform 25 sends confirmation of registration of the target device 11 to the universal communication platform 21.

After successful registration of the target device 11 with the network 14, the target device 11 automatically deactivates its microphone 31. The user 17 can reactivate the microphone 31 by sending a corresponding instruction to the target device 11 or using a switch, which is not shown, on the target device 11. It is also possible that the user 17 is able to adjust the behavior of the microphone 31.

If registration of the target device 11 with the network 13 fails, then the target device 11 generates an error audio file and outputs this via a built-in speaker 33. The error audio file is received by the terminal device 18 of user 17 and then sent to the universal communication platform 21. The universal communication platform 21 first extracts the contents of the error audio file, meaning the error message of the target device 11, and generates an error log, for example in the form of an ASCII file, which contains the error message of the target device 11. The universal communication platform 21 sends the error log to the specific communication platform 25. A table is stored in the specific communication platform 25 in which every possible error message is assigned a suitable reply message in the form of troubleshooting instructions for the user 17. The specific communication platform 25 sends the appropriate reply message to the universal communication platform 21, which it then sends to the terminal device 18 of the user 17 in the form of an electronic message.

If the reply to request of the universal communication platform 21 sent to the specific communication platform 25 asking if the target device 11 is allowed to register with a network is negative, meaning that the target device 11 is not allowed to register with the network 13, then the universal communication platform 21 sends a corresponding electronic message to the terminal device 18 of the user 17.

What is claimed is:

1. A method for initially registering a target device (11) of a user (17) with a network (13) for establishment of a communication link between the target device (11) and other subscribers in the network (13), the user (17) having a terminal device (18) in communication relationship with a universal communication platform (21) for enabling communication between the terminal device (18) and the target device (11), the target device (11) comprising an interface via which information including status information or measured values of the target device (11) can be read and/or the target device (11) can be controlled upon establishment of the communication link with the aid of the universal communication platform (21), said method comprising the following steps:

the user (17) sends an electronic registration message from the terminal device (18) to the universal communication platform (21) wherein the electronic registration message comprises information about an identity of the target device (11) and an option for registering the target device (11) with said network (13), the universal communication platform (21) first interprets the electronic registration message received by searching for at least one keyword regarding registering;

the universal communication platform (21) if it recognizes the at least one keyword extracts said information on the identity of the target device (11) and the option for registration with said network (13) in the electronic registration message;

the universal communication platform (21) generates an encoded audio file with said information integrated into the audio file comprising an encoded signal using positive and negative zero crossings of the encoded signal to integrate said information into the audio file, said encoded audio file is then sent by the universal communication platform (21) to said terminal device (18) of the user (17), the encoded audio file is played by a built-in speaker of said terminal device (18) of the user (17) or the terminal device (18) of the user (17) sends the encoded audio file to a device with a speaker from which the sounds recorded in the audio file with said information are outputted in a vicinity of a microphone of the target device (11), a sound content of the encoded audio file is captured by the microphone (31) of the target device (11), and the information on the option for registering with said network (13) is extracted lay the target device (11) from the captured sound content of the encoded audio file, and the target device (11) using the encoded sound content of the audio file evaluates first the information on the identity of the target device (11) and if it matches the identity of the target device (11) it then in addition extracts information about the options for registration of the target device (11) and registers with the network (13) using said extracted captured information on the registration option.

2. The method according to claim 1, characterized in that the universal communication platform (21) checks if the target device (11) is allowed to register with said network (13) and only sends said encoded audio file to the terminal device (18) of the user (17) when a result of the check is positive.

3. The method according to claim 2, characterized in that the universal communication platform (21) exchanges information with at least one specific communication platform (25, 27) for said check to determine if the target device (11) is allowed to register with said network (13).

4. The method according to claim 3, characterized in that the universal communication platform (21) can receive electronic registration messages from more than one recipient address, wherein in particular each recipient address is assigned to one of the at least one specific communication platform (25, 27).

5. The method according to claim 4, characterized in that the target device (11), after successful registration with the network (13), sends a registration confirmation to the universal communication platform (21) and/or to the one of the at least one specific communication platform (25, 27), and after receiving the registration confirmation, the target device (11) is assigned to the user (17).

6. The method according to claim 1, characterized in that the microphone (31) of the target device (11) is automatically deactivated after successfully registering with the network (13).

7. The method according to claim 1, characterized in that
the target device (11) generates and outputs an error audio file upon unsuccessful registration with the network (13),
the error audio file is received by a terminal device (18) of the user (17) and sent to the universal communication platform (21), and
the universal communication platform (21) evaluates the error audio file and sends an appropriate reply message back to the user (17).

8. The method according to claim 7, characterized in that the universal communication platform (21) exchanges information with at least one specific communication platform (25, 27) for a generation of said reply message.

9. The method according to claim 8, characterized in that the universal communication platform (21) converts the error audio file into an error log and sends the error log to the at least one specific communication platform (25, 27).

* * * * *